US009327233B2

(12) United States Patent
Kropf

(10) Patent No.: US 9,327,233 B2
(45) Date of Patent: May 3, 2016

(54) METHOD OF BENEFICIATING AND DRYING TRONA ORE USEFUL FOR FLUE GAS DESULFURIZATION

(75) Inventor: Jared M. Kropf, Green River, WY (US)

(73) Assignee: TRONOX ALKALI WYOMING CORPORATION, Stamford, CT (US)

( * ) Notice: Subject to any disclaimer, the term of this patent is extended or adjusted under 35 U.S.C. 154(b) by 374 days.

(21) Appl. No.: 13/025,700

(22) Filed: Feb. 11, 2011

(65) Prior Publication Data
US 2012/0063974 A1 Mar. 15, 2012

Related U.S. Application Data

(60) Provisional application No. 61/382,591, filed on Sep. 14, 2010.

(51) Int. Cl.
*B01D 53/50* (2006.01)
*C01D 7/22* (2006.01)
*B01D 53/83* (2006.01)

(52) U.S. Cl.
CPC ............. *B01D 53/508* (2013.01); *C01D 7/22* (2013.01); *B01D 53/83* (2013.01); *B01D 2251/304* (2013.01); *B01D 2251/606* (2013.01); *B01D 2253/304* (2013.01); *B01D 2257/302* (2013.01); *B01D 2258/0283* (2013.01)

(58) Field of Classification Search
None
See application file for complete search history.

(56) References Cited

U.S. PATENT DOCUMENTS

| 2,343,080 | A |   | 2/1944 | Pike |   |
|---|---|---|---|---|---|
| 3,066,797 | A |   | 12/1962 | Fraenkel |   |
| 3,244,476 | A |   | 4/1966 | Smith |   |
| 3,305,089 | A |   | 2/1967 | Fraenkel |   |
| 3,819,805 | A | * | 6/1974 | Graves | ........................ 423/206.1 |
| 3,904,733 | A | * | 9/1975 | Gancy et al. | ................ 423/206.2 |
| 3,962,403 | A |   | 6/1976 | Wyslouzil |   |
| 3,992,287 | A |   | 11/1976 | Rhys |   |
| 4,018,868 | A |   | 4/1977 | Knight |   |
| 4,202,667 | A |   | 5/1980 | Conroy |   |

(Continued)

FOREIGN PATENT DOCUMENTS

WO WO 2007/020205 A1 2/2007
WO WO 2009/062177 A2 5/2009

OTHER PUBLICATIONS

Solvay Chemicals presentation, Dry Sorbet Injection of Sodium Sorbents, Emission Control and Measurement Workshop (Mar. 2010).*

(Continued)

*Primary Examiner* — Melissa Swain
(74) *Attorney, Agent, or Firm* — Williams Mullen, PC; F. Michael Sajovec

(57) ABSTRACT

A method of producing trona suitable for flue gas desulfurization comprising mechanically mining a trona ore deposit containing insoluble impurities; crushing the mined trona ore to create a mixture of uncalcined trona-rich particles and impurities-rich particles; beneficiating the crushed uncalcined trona ore to obtain a trona-rich, impurities-depleted ore fraction; and drying the trona-rich ore fraction under non-calcining conditions to yield a dry uncalcined trona ore. A preferred embodiment includes concurrently milling and drying the trona-rich, impurities-depleted ore fraction to recover a low moisture content trona product having a high $NaHCO_3$:$Na_2CO_3$ ratio, useful for the efficient dry injection desulfurization of flue gas streams.

21 Claims, 3 Drawing Sheets

(56) References Cited

U.S. PATENT DOCUMENTS

| | | | |
|---|---|---|---|
| 4,236,640 A | 12/1980 | Knight | |
| 4,268,088 A | 5/1981 | Price | |
| 4,341,744 A | 7/1982 | Brison | |
| 4,375,454 A | 3/1983 | Imperto | |
| 4,555,391 A | 11/1985 | Cyran | |
| 4,588,569 A | 5/1986 | Cyran | |
| 4,667,885 A | 5/1987 | Datta | |
| 5,470,554 A | 11/1995 | Schmidt | |
| 5,736,113 A * | 4/1998 | Hazen et al. | 423/206.2 |
| 5,911,959 A | 6/1999 | Wold | |
| 6,092,665 A | 7/2000 | Schmidt | |
| 6,173,840 B1 | 1/2001 | Pruszko | |
| 6,270,555 B1 | 8/2001 | Wood | |
| 6,479,025 B2 * | 11/2002 | Denham et al. | 423/206.2 |
| 7,473,407 B2 | 1/2009 | Phillip | |
| 7,481,987 B2 * | 1/2009 | Maziuk, Jr. | 423/215.5 |
| 7,531,154 B2 | 5/2009 | Maziuk | |
| 7,708,145 B2 | 5/2010 | Li | |
| 7,770,735 B2 | 8/2010 | Phillip | |
| 2005/0201914 A1 | 9/2005 | Ritzenthaler | |
| 2007/0081936 A1 | 4/2007 | Maziuk, Jr. | |
| 2008/0277321 A1 | 11/2008 | Phillip | |
| 2009/0212140 A1 | 8/2009 | Ritzenthaler | |

OTHER PUBLICATIONS

Liang, "Carbon Dioxide Capture from Flue Gas Using Regenerable Sodium-Based Sorbents", MS Thesis, LSU, Aug. 2003.

Davidson, "Solvair Select 150 Solution" Solvay PowerPoint, May 2010, 13 pages.

Atwell & Wood, "Sodium Sorbents for Dry Injection Control of S02 & S03", Solvay Solvair PowerPoint, 2009, 23 pages.

Solvay, "SOLVair Select 200 (Natural Sodium Sesquicarbonate)", Technical Data Sheet, Jan. 2008.

Solvay, "Trona—Sodium Sesquicarbonate", Solvay Chemicals Technical Publication, 2005, 6 pages.

Orgul, "Evaluation of Soda Ash Production Parameters from Beypazari Trona Ore" Ph.D. Thesis, Aug. 2003.

* cited by examiner

METHOD OF BENEFICIATING AND DRYING TRONA ORE USEFUL FOR FLUE GAS DESULFURIZATION

FIELD OF THE INVENTION

The present invention relates to a method of producing uncalcined trona ore suitable for use in dry injection flue gas desulfurization of combustion gas streams and, more particularly, to a method of beneficiating and drying mechanically-mined impure trona ore to increase its sodium sesquicarbonate content.

BACKGROUND OF THE INVENTION

Flue gas desulfurization of combustion gas streams with an injected dry sorbent for sulfur oxide removal (sulfur oxides collectively being referred to as $SO_X$, which comprises $SO_2$ and $SO_3$) provides an increasingly favorable alternative to the traditional wet scrubbing techniques, using lime or limestone as the $SO_2$-reactive agent, or spray drying systems, using lime as the preferred $SO_2$-reactive agent.

Dry sorbent flue gas desulfurization offers advantages of operational simplicity and reliability, competitive reagent costs, high $SO_X$-removal efficiencies, attractive equipment and labor costs, and lower water consumption over the widely used wet scrubbing desulfurization procedures currently in use. Dry sorbent flue gas desulfurization is particularly well-suited for retrofitting existing combustion flue gas facilities such as coal-fired electric power utility plants in need of upgraded $SO_X$ pollution control.

In dry sorbent flue gas desulfurization, a suitable sorbent such as trona or nahcolite is injected as a dry powder into a $SO_X$-containing combustion flue gas stream where it becomes fluidized and entrained in the flowing hot gas stream and is then collected downstream, usually along with entrained fly ash in the hot flue gas stream, via particulate solids control equipment such as electrostatic precipitators or fabric filtration (baghouse filters) collection devices. The $SO_X$ removal occurs while the particulate sorbent is carried in the hot flue gas stream and also while the collected sorbent is still in contact with the flowing gas stream. The collected solids mixture of sorbent-$SO_X$ reaction product and fly ash is periodically removed for disposal.

Trona, a naturally-occurring mineral form of sodium sesquicarbonate, is especially favored as a dry injection sorbent for $SO_X$ control. Commercial acceptance of the use of trona as a dry injection flue gas desulfurization agent is not only dependent on $SO_X$-removal reaction efficiencies of trona but also on the overall cost of trona per unit $SO_X$ removed.

Many prior art patents disclose techniques for treating trona ore, to remove impurities like insoluble oil shale from the naturally-occurring trona ore, but the teachings of these patents are typically directed to the purification and calcination of trona ore used to make soda ash ($Na_2CO_3$).

U.S. Pat. No. 3,244,476 of Smith (Intermountain Research & Development Corp.) describes a process for separation of the soluble fraction (sodium carbonate) from the insoluble fraction (shale, silica, etc.), in which crude trona is first calcined, then crushed and the smaller-sized calcined trona fraction is preferentially separated from the larger-sized sintered shale fraction, to recover a soda ash with low insolubles content.

U.S. Pat. No. 3,819,805 of Graves et al. (Allied Chemical Corp.) describes a process in which mined and crushed trona is separated from the insoluble shale impurities via a color separation technique. The trona, which is primarily white, tan and light brown in color, is separated from the dark brown, green gray and black pieces, by an optical sorting procedure on the crushed, wetted ore pieces that are preferably 0.5 in. to 6 in. in diameter. The optical sorting may be based on reflectivity, transmission or absorption of electromagnetic radiation of selected wavelength(s) or on a variable standard of fluorescence. The patent also notes that crushing trona ore tends to concentrate the insolubles in the finer-sized fraction (col. 3, lines 1-7). The trona fraction of white and light brown pieces is then subjected to calcination to recover a sodium carbonate or soda ash product.

U.S. Pat. No. 4,341,744 of Brison et al. (Stauffer Chemical Co.) describes a process for producing soda ash (sodium carbonate) by crushing the trona ore to a maximum particle size of 4 mm and removing fines, separating the particles into at least two fractions by electrostatic separation to obtain a beneficiated trona fraction, and calcining the beneficiated fraction to convert the trona to soda ash.

U.S. Pat. No. 4,375,454 of Imperato et al. (Intermountain Research & Development Corp.) describes a process for beneficiating trona or nahcolite ore by crushing the trona ore to a particle size less than about 6.7 mm, calcining the crushed ore to give obtain at least a surface coating of sodium carbonate, separating off the fines and then subjecting sized particles greater than 0.212 mm to a high voltage gradient separation to recover an electrostatically-enriched soda ash fraction. The beneficiated soda ash may be sold as is or used as feed to a monohydrate soda ash process.

Several patents assigned to Environmental Projects, Inc. describe multistep beneficiation processes applicable to the treatment of trona ore to remove impurities.

U.S. Pat. No. 5,470,554 of Schmidt et al. (Environmental Projects) describes a multistep process for the beneficiation of saline minerals, e.g., trona ore, by crushing and sizing the ore via separate steps of density separation of a first ore portion, electrostatic separation of a second portion and magnetic separation of a third portion. In the case of trona, the Schmidt et al. '554 patent teaches that the ore impurity shortite may be separated from trona via density separation and that shale, mudstone and pyrite impurities may be separated via electrostatic separation. The patent also teaches that the trona ore may be dried prior to the various separation steps, to effect better separation of the impurities. The purified trona is said to be particularly suited for use in manufacture of caustic soda for alumina production and in the glass industry.

U.S. Pat. No. 6,092,665 of Schmidt et al. (Environmental Projects) is a continuation-in-part of Schmidt et al. '554, summarized above. The Schmidt et al. '665 patent differs from Schmidt et al. '554 in that the '665 patent includes an additional step of calcining the trona ore and subsequently separating a first portion of impurities by density separation.

U.S. Pat. No. 5,736,113 of Hazen et al. (Environmental Projects) describes a process for removing impurities from trona via an electrostatic separation method carried out at a temperature between about 25° C. and about 45° C. The trona beneficiation may also include other types of separation operations, such as magnetic separation, density separation, and size separation. The patent also teaches that the trona ore may be dried prior to the various separation steps, to effect better separation of the impurities. The Hazen et al. '113 patent states that the beneficiated trona may be calcined to produce sodium carbonate.

U.S. Pat. No. 5,911,959 of Wold et al. (Environmental Projects) describes multistep processes for the treatment of trona ore having insoluble impurities, by first calcining the crushed ore and then subjecting the calcined trona to dry or wet separation steps or both. The dry separation processes may include density separation, magnetic separation, or electrostatic separation steps, and the wet separation processes may include introduction of the calcined trona to a saturated sodium carbonate brine solution to effect crystallization of sodium carbonate monohydrate. Sodium carbonate is recovered as the product in these multistep processes.

U.S. Pat. No. 6,173,840 of Pruszko et al. (Environmental Projects) discloses a beneficiation process applicable to purification of saline minerals, trona being preferred, and the process utilizes a magnetic separation technique. Other separation techniques may be employed in conjunction with the magnetic separation, including colorimetric separation, density separation and size separation. The trona is preferably calcined prior to carrying out the magnetic separation and density separation. Apart from the optional calcination, the patent also teaches that the trona ore may be dried prior to the various separation steps, to effect better separation of the impurities. The Pruszko et al. '840 patent mentions that the shortite separated and recovered as an impurity from trona may be used in the treatment of flue gases from removal of sulfur or acidic gases from the flue gas (sentence bridging cols. 8-9.)

U.S. Pat. No. 7,473,407 and U.S. Pat. No. 7,770,735 of Phillip et al. (Solvay Chemicals) describe beneficiation processes for trona ore in which crushed trona ore is first crushed and dried. The dried trona ore is then separated into a first (larger) size fraction and second (smaller) size fraction, the latter having reduced impurity levels. The first fraction is subjected to magnetic separation to remove impurities from this first ore fraction. The two beneficiated trona ore fractions may then be combined.

The trona patents summarized above do not mention use of trona for dry injection pollution control applications such as flue gas desulfurization. However, as mentioned above, an important and growing market for trona ore is in flue gas desulfurization, via injection as a particulate solid into combustion gas streams, for removal of $SO_X$ before the gas stream is released into the atmosphere. The use of trona in dry injection flue gas desulfurization is described in the prior art, in both older and more recent patents.

U.S. Pat. No. 4,555,391 of Cyran et al. (Intermountain Research & Development Corp.) describes a dry injection desulfurization process that uses a dry soda-type compound such as trona or nahcolite as the sorbent to desulfurize a $SO_2$-containing flue gas stream and recycles a portion of the spent sorbent to increase sorbent utilization efficiency. U.S. Pat. No. 4,588,569 of Cyran et al. (Intermountain Research & Development Corp.) describes a dry injection desulfurization process that uses a calcined soda ash sorbent, obtained from calcination of a $NaHCO_3$-containing compound like sodium bicarbonate or sodium sesquicarbonate (trona), to desulfurize a $SO_2$-containing flue gas stream at a temperature of 100° C. to about 175° C.

U.S. Patent Publication No. 2005-0201914 of Ritzenthaler (American Electric Power Co.) describes a dry injection process for removing acid gases, including sulfur trioxide and sulfuric acid, from flue gas streams using a dry sodium sorbent. The sodium sorbent may be sodium sesquicarbonate, sodium carbonate-bicarbonate, trona or mechanically refined ore, which is injected into the flue gas stream and calcined to soda ash which reacts with the strong acid components in the flue gas.

U.S. Pat. No. 7,481,987 of Maziuk, Jr. (Solvay Chemicals) describes a dry injection desulfurization process in which sulfur trioxide ($SO_3$) is removed from a flue gas stream, using a sorbent that is sodium sesquicarbonate (preferably trona) or sodium bicarbonate or soda ash. U.S. Pat. No. 7,531,154 of Maziuk, Jr. (Solvay Chemicals) describes a dry injection desulfurization process in which sulfur dioxide ($SO_2$) is removed from a flue gas stream at a temperature of about 600° F. to about 900° F., using trona as the sorbent. Both patents disclose that Solvay's T-200® trona product is a suitable trona source and that T-200® trona is a mechanically refined trona ore of about 97.5% sodium sesquicarbonate having a mean particle size of about 24-28 microns.

The present invention provides a method for producing high purity dry trona product from impure trona ore deposits, to provide an uncalcined particulate trona product that is especially well suited for removing pollutants from gas streams via dry injection flue gas desulfurization.

BRIEF SUMMARY OF THE INVENTION

In accordance with the present invention, a method of producing trona suitable for dry injection pollution control comprises mechanically mining a trona ore deposit containing at least about 5 wt % insoluble impurities; crushing the mined trona ore to create a mixture of uncalcined trona ore particles comprising trona-rich particles and impurities-rich particles; beneficiating the crushed uncalcined trona ore, without prior drying of the unbeneficiated ore, to obtain a trona-rich, impurities-depleted ore fraction; and drying the trona-rich ore fraction under non-calcining conditions to yield a dry uncalcined trona ore.

Another embodiment of the present invention is a method of producing trona suitable for dry injection pollution control which comprises mechanically mining a trona ore deposit containing at least about 5 wt % insoluble impurities; crushing the mined trona ore to create a mixture of uncalcined trona ore particles comprising trona-rich particles and impurities-rich particles; beneficiating the crushed uncalcined trona ore, without prior drying of the unbeneficiated ore, to obtain a trona-rich, impurities-depleted ore fraction; and concurrently milling and drying the trona-rich ore fraction under non-calcining conditions to yield a dry uncalcined trona ore having a mean particle size less than about 50 microns and containing less than about 0.1 wt % free moisture.

Still another embodiment of the present invention is a process for flue gas desulfurization comprising injecting a particulate dry trona sorbent made by the method of this invention into a hot combustion gas stream containing $SO_X$, maintaining the trona sorbent in contact with the $SO_X$-containing flue gas stream for a time sufficient to react with at least a portion of the $SO_X$, collecting the injected and reacted trona sorbent downstream of the injection point in a solids collection device, and releasing the gas stream into the atmosphere.

DETAILED DESCRIPTION OF THE INVENTION

Trona Product—Characteristics & Advantages

Figure 1:
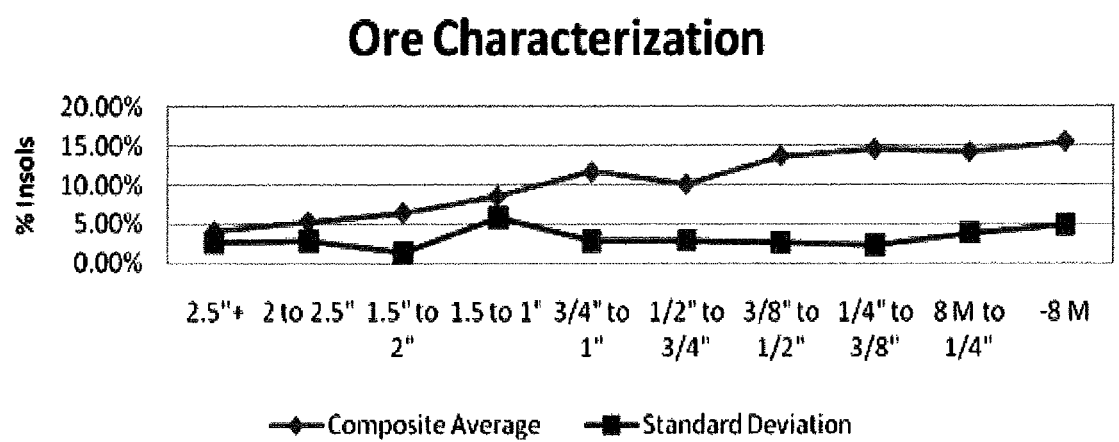
FIG. 1 is a plot of trona ore insolubles content as a function of ten size fractions of mined and crushed trona ore, ranging from +2.5 inch to −8 mesh, showing an increase in impurities content as the trona particle fraction size decreased.

The trona ore product of this invention is a beneficiated trona ore product that is particularly suited for removal of contaminants from combustion flue gas streams, e.g., $SO_X$ removal via dry injection desulfurization. The trona ore product is noteworthy for its relatively high purity, containing less than about half of the insoluble impurities originally present in the unbeneficiated trona ore. More preferably, the trona ore product is beneficiated according to this invention to contain less than about 5 wt % insoluble impurities and, most preferably, less than about 3 wt % insoluble impurities.

An additional characteristic of the trona ore product of this invention is its relatively high sodium bicarbonate content, relative to its sodium carbonate content, indicative of a trona product that has not undergone any appreciable calcination. The trona product preferably contains or exhibits a weight ratio of $NaHCO_3:Na_2CO_3$ of at least about 0.75:1 and, more preferably, a weight ratio of $NaHCO_3:Na_2CO_3$ of at least about 0.78:1.

Pure trona, i.e., sodium sesquicarbonate, has a theoretical weight ratio of $NaHCO_3:Na_2CO_3$ of 0.79:1. Samples of low-impurities trona ore mined from the Green River Basin have been analyzed as containing a weight ratio of $NaHCO_3:Na_2CO_3$ of as high as 0.81:1. This is believed to be due to the presence of very small concentrations (no more than 1-2 wt %) of other soluble $NaHCO_3$-containing minerals with the sodium sesquicarbonate in trona ore, such as nahcolite (essentially $NaHCO_3$) or wegscheiderite (essentially $Na_2CO_3.3NaHCO_3$ or $Na_5(CO_3)(HCO_3)_3$).

On the other hand, trona ore containing significant impurities (soluble and insolubles) can contain other soluble $Na_2CO_3$-containing minerals in trona ore, e.g., shortite (essentially $Na_2CO_3.CaCO_3$ or $Na_2Ca_2(CO_3)_3$), even in small amounts, and such $Na_2CO_3$-containing impurities can drive the overall weight ratio of $NaHCO_3:Na_2CO_3$ below the theoretical value of 0.79:1 for pure trona. Bicarbonate:carbonate ratios for trona containing significant insolubles (and also soluble $Na_2CO_3$-containing impurities) are typically below 0.79:1, with 0.77:1 being representative, and such ratios are not always attributable to calcination that could have occurred during vigorous drying of such trona.

The method of the present invention provides a number of unexpected benefits and advantages that are particularly useful in the production of a purified trona product having the characteristics just noted. Beneficiation of the crude trona in the method of this invention, prior to carrying out a drying step to provide a very low moisture content trona ore product, surprisingly reduces the overall heat load required for drying, permitting reduced drying temperatures or residence times or both, while still achieving the desired very low moisture content in the trona product. In addition, such reduced stringency drying conditions greatly reduce the likelihood of unwanted trona calcination, even in very small amounts, thus providing a trona product whose $NaHCO_3:Na_2CO_3$ ratio is extremely high, evidencing essentially no calcination or decomposition of the sodium sesquicarbonate in the trona product.

The relatively high purity and low calcination of the trona ore product of this invention are advantageous in the use of the trona product for treatment of contaminants in combustion flue gas streams. First, the high sodium sesquicarbonate content of the beneficiated trona maximizes the amount of active ingredient, $Na_2CO_3.NaHCO_3.2H_2O$, per unit weight of trona product, thus providing a highly efficient agent for contaminant removal. Secondly, the trona product is essentially uncalcined, maximizing the amount of sorbent available for activation.

The beneficiated trona ore product of this invention is further characterized by having a relatively low free moisture content. The free moisture content of trona ore, it should be noted, does not include water of hydration that is bound in trona, i.e., sodium sesquicarbonate, $Na_2CO_3.NaHCO_3.2H_2O$. The beneficiated trona ore product preferably contains less than about 0.1 wt % free moisture and, more preferably, less than about 0.07 wt % free moisture. The beneficiated trona ore product most preferably contains even lower moisture levels: less than about 0.05 wt % free moisture and, even better, less than about 0.03 wt % free moisture. The low insoluble impurities content of the beneficiated trona ore is an important factor that facilitates drying of the beneficiated trona ore product to these preferred free moisture levels. The beneficiated trona of this invention is capable of being dried under relatively moderate drying conditions that do not result in unwanted calcination of the sodium sesquicarbonate content of the trona.

The relatively low moisture content of the trona ore product of this invention is advantageous in the shipment and storage and use of the product as a dry-injection agent for treatment of contaminants in combustion flue gas streams. The low moisture content of the trona product reduces the likelihood that a finely-sized trona product will compress, compact, cake, clump, bridge, harden or otherwise fail to be free-flowing when removed from a bulk solids transport carrier (e.g., railcars or road trailers) or bulk solids storage or holding container (e.g., silos or hoppers). The low-moisture trona product of this invention can thus be provided as a milled, or otherwise ground, or size-separated product with relatively fine particle sizing, e.g., having a mean particle size that is less than about 100 microns, even substantially less than 50 microns.

Finally, the trona product of this invention is a high purity product that is nevertheless produced from relatively poor quality trona ore deposits, i.e., trona deposits containing significant levels of impurities which would otherwise preclude use of such trona for low cost end-use applications for a trona alkali product. The present invention provides a novel method for the economical production of high quality trona product for end-use applications that require a low cost but high purity, low moisture content trona product. The trona product of this invention is not only a high purity product but is also further characterized by the trona being essentially uncalcined. These trona product characteristics make it especially well-suited as an efficient agent for dry injection treatment of flue gas streams, particularly as a sorbent in flue gas desulfurization operations.

Trona Ore Source Material—Impurities

The trona ore utilized in this invention is obtained from deposits of crude trona ore that contain a significant insoluble impurities content. The trona ore deposits are mostly sodium sesquicarbonate, $Na_2CO_3.NaHCO_3.2H_2O$, but these crude trona ore deposits also contain impurities, both insoluble and soluble. The impurities in trona ore are defined, for purposes of this disclosure, as the components of crude trona ore that are not sodium sesquicarbonate, $Na_2CO_3.NaHCO_3.2H_2O$.

The focus of the present invention is reducing the content of impurities in crude trona ore, particularly insoluble impurities since such insolubles comprise the majority of the impurities present in crude trona ore. The insoluble impurities in crude trona ore include those components that are essentially insoluble in water, and the amounts of these insolubles present in trona ore are readily quantifiable by simple laboratory test procedures.

The impurities in trona ore comprise both insoluble impurities present in the trona ore deposit and soluble impurities that are likewise present in the trona ore deposit, as described in more detail below. The insoluble impurities are normally present in substantial amounts, as compared to the soluble impurities. Soluble impurities are typically only a minor proportion, e.g., less than 10% by weight, of the total of impurities, both insoluble and soluble, present in the trona ore deposit.

The insoluble impurities in trona ore, discussed in more detail below, are present in amounts typically ranging from less than about 3 wt % up to about 20 wt % or more, about 3 wt % to about 15 wt % being representative, depending on the location of the trona ore being recovered.

It should be readily apparent that naturally-occurring trona ore deposits are not homogeneous, so both the composition and amounts of impurities can vary widely, even within a small region of a trona deposit being mined. For purposes of the present specification, the impurities content of a trona ore deposit being mined or exploited refers the representative composition of a mined trona ore sample, using standardized ore sampling techniques, that includes the sodium sesquicarbonate in the trona ore and its associated impurities that are also included in the sample of mined ore. Such associated impurities, it should be recognized, may be intimately associated with the trona (sodium sesquicarbonate) or may be more generally associated with the trona, e.g., strata adjacent to the trona, both being recovered and present in the mined trona ore.

The preferred trona ore source employed in this invention is located in natural trona ore deposits located in the Green River Basin in southwestern Wyoming, U.S.A., mostly in Sweetwater County, Wyoming.

These subterranean trona deposits consist of a main trona bed varying from about 8 to 18 feet in thickness (averaging about 8 to 11 feet), located underground about 1100 to 1800 feet below the surface in a substantially horizontal layer or stratum. Other trona beds of lesser thicknesses are typically located adjacent to the main bed, usually overlying the main bed, separated by layers of shale.

Other sources of natural deposits of trona ore may also be utilized as the trona ore source material in the present invention. Such natural trona ore sources include, e.g., the Beypazan Basin trona deposits in Turkey, the Wucheng Basin, Biyang Depression, and Nei Mongol (Inner Mongolia) Plateau trona deposits in China; and in Africa, the Makgadikgadi Pan trona deposits of Botswana and the Magadi Lake trona deposits in the rift valley of Kenya. As is the case with crude trona ore from the Green River Basin in Wyoming, these other worldwide natural trona ore deposits also contain significant concentrations of impurities.

As mentioned above, insoluble impurities comprise the majority of impurities typically found in crude trona ore, e.g., trona ore deposits found in the Green River Basin. The crude trona ore employed as a source ore in this invention should contain a significant level of impurities, greater than about 3 wt % insoluble impurities. The method of this invention is especially well suited for use with crude trona ore containing high amounts of insoluble impurities, e.g. at least 5 wt % insoluble impurities and preferably at least 10 wt % insoluble impurities.

The insoluble impurities content of a crude trona ore source should be measured using sampling techniques that provide a representative measure of the trona ore impurities content of the source material being employed, e.g., an average impurities content of the area or region of the crude trona ore deposit being mined rather than being a point sample or small fraction of the mined trona ore. Such sampling techniques are well known to those skilled in trona mining and assaying the components of a natural trona ore deposit.

The identities of impurities that may be present in crude trona ore are generally well known. However, both the individual impurity components in crude trona ore and their cumulative impurities content may vary widely, depending on the area or region or location of the natural trona ore deposit where the crude trona ore is obtained.

Crude trona ore impurities that are categorized as insolubles are mainly oil shale, but also include gangue minerals and salts that are usually present in the natural trona ore deposit and that are not appreciably soluble in water.

The main insoluble impurity of crude trona is shale or oil shale which typically comprises marlstone (high limestone or dolomitic shale) that is rich in organic matter. Other constituents of the insoluble impurities that may be present in crude trona ore include gangue inorganics such as quartz, dolomite ($CaMg(CO_3)_2$), microcline ($KAlSi_3O_8$), calcite ($CaCO_3$), muscovite or mica, feldspar, mudstone, and clay minerals, and also organic matter such as kerogen.

The impurities in crude trona ore may also include various salts, both soluble and insoluble salts. These salts are normally present in very low concentrations, e.g., less than about 0.3 wt %, and consequently are not a significant factor in the beneficiation of crude trona ore in this invention. Soluble salts that may be present as soluble impurities in trona ore deposits include halite (sodium chloride, NaCl), sodium sulfate ($Na_2SO_4$), nahcolite ($NaHCO_3$) and wegscheiderite ($Na_2CO_3.3NaHCO_3$). In passing, it should be noted that sodium sesquicarbonate ($Na_2CO_3.NaHCO_3.2H_2O$) is also soluble in water, as are its sodium carbonate and sodium bicarbonate constituents.

Insoluble salts that may be present in crude trona in relatively small amounts include the following salts that are not appreciably soluble in water: iron salts, usually hematite ($Fe_2O_3$), but also glauconite (an iron potassium phyllosilicate) and pyrite ($FeS_2$), and shortite ($Na_2CO_3.2CaCO_3$ or $Na_2Ca_2(CO_3)_3$).

Some of these impurities may be present in concentrations higher than about 0.3 wt % for some trona ore deposit seams or regions, e.g., notably, shortite, but the presence of such higher than normal concentrations of these impurities does not adversely affect the recovery of beneficiated trona ore in the method of the present invention.

Insoluble Impurities in Trona and Moisture Issues

The insoluble impurities present in trona ore are problematic in the drying of trona ore to remove free moisture from the ore, and the present invention provides a solution to this problem. The inventor has discovered that, at significant insolubles concentrations in trona ore, removal of free moisture by drying becomes increasingly more difficult. Insoluble impurities in significant concentrations, in excess of 5 wt % of the trona ore, strongly retain free moisture and make the evaporative removal of such moisture by drying, without concurrent calcination of the sodium sesquicarbonate, very difficult.

Calcination of trona, i.e., sodium sesquicarbonate ($Na_2CO_3.NaHCO_3.2H_2O$), for purposes of this specification, is intended to mean removal of the compound's hydrated water or decomposition of the sodium bicarbonate into sodium carbonate or both. Even partial calcination of trona can reduce its effectiveness as a sorbent in the treatment of gas streams by dry injection, to remove pollutants or contaminants present in such gas streams. Calcination of trona may often be visually confirmed by a change of the trona off-white surface color to a whitish appearance on the surface of the trona particle.

Free moisture contents in trona ore samples can vary widely. Trona ore containing low insolubles contents, e.g., below about 3 wt % insolubles, may contain very low free moisture contents, e.g., below about 0.05 wt % $H_2O$. Trona ore containing significant insolubles contents, e.g., above about 5 wt % insolubles, and particularly above 10 wt % insolubles may contain much higher free moisture contents, e.g., well above 0.1 wt % $H_2O$. These free moisture amounts in trona ore depend, of course, on the exposure of the ore to environmental and other sources of water. Representative samples of mined and crushed trona ore from the Green River Basin deposits have been analyzed as containing more than 1 wt % free moisture.

Notwithstanding the absolute amounts of free moisture contained in trona ore of varying insolubles content, the inventor has discovered (as noted above) that, for trona ore containing significant amounts of insoluble impurities, removal of such free moisture is increasingly more difficult as the insolubles content of the trona is increased.

Drying of high insolubles-content trona ore, when compared with drying of high purity trona (<3 wt % insoluble impurities), requires longer residence times or higher drying temperatures or both to achieve very low free moisture contents, e.g., below about 0.1 wt % $H_2O$, in the dried ore. Such stringent drying conditions increase the likelihood that some of the trona (sodium sesquicarbonate) may be calcined, leading to a reduced $NaHCO_3$-content in the dried trona ore, an undesirable result for trona intended for use in the dry-injection treatment of flue gas streams.

Under essentially equivalent-temperature moderate drying conditions, drying of very high insolubles-content trona ore, e.g., >10 wt % insolubles, can require drying residence times of 4-5 times longer than drying of low insolubles-content trona ore, i.e., <3 wt % insolubles, and there is no assurance that a very low moisture content uncalcined trona product (<0.05 wt % free moisture) can be obtained from the high insolubles-content trona ore.

Free moisture contained in or on trona ore may be either of two categories: bulk free moisture, which is, e.g., liquid or unbound water on or in the ore, and which accounts for most of free moisture typically present in mined and crushed trona ore, and adsorbed or absorbed free moisture, which results from the adsorption or absorption or attraction of liquid water or water vapor, e.g., into pores or onto pore surfaces or onto other material surfaces in the crude trona ore. Free moisture or free water in trona ore does not include waters of hydration, such as the hydrated water bound in sodium sesquicarbonate.

The inventor has discovered that adsorbed or absorbed free moisture in mined and crushed trona ore is aggravated or increased by the presence of insoluble impurities in the trona ore, which appear to be hygroscopic (although the inventor does not wish to be bound by any particular theory or mechanism of action by which water is bound to trona impurities). Pure trona, i.e., sodium sesquicarbonate, itself is not believed to be hygroscopic.

Free moisture contained in or on trona ore can result from exposure of the trona to liquid water, e.g., exposure of the trona ore to water vapor present in the atmosphere or in the environment in proximity to the trona, exposure to natural precipitation (rain, snow), exposure to mine water, or to deliberate water-wetting of the trona (e.g., for dust suppression and/or removal).

Removal of bulk free moisture in or on trona ore is normally readily accomplished during drying of the trona, but adsorbed or absorbed free moisture presents a much greater drying challenge. Insoluble impurities contained in trona ore appear to retain absorbed or adsorbed free moisture and retard the evaporation rate of such moisture during drying of trona with increased insolubles contents.

The inventor speculates, without wishing to be bound to a particular theory, that one or more of the following mechanisms may be involved in the increased free moisture retention of high insolubles-content trona ore:

- the insoluble components or material may have a higher porosity, e.g., pore area, than pure trona (sodium sesquicarbonate), providing more surface area for moisture interaction or attraction. The porosity of the insolubles may also be different in nature than that of pure trona, e.g., smaller/larger pore diameters, more/less divergent pores, deeper/shallower pore depths, or more/fewer numbers of pores.
- one or more of the insoluble components may have a chemical composition that exhibits a greater affinity for water than does pure trona, i.e., sodium sesquicarbonate.
- one or more of the insoluble components may have desiccant-like or hygroscopic-like properties that cause high insolubles-content trona ore to rapidly absorb or adsorb moisture from the environment or atmosphere.

Trona Ore Mining

Trona ore source material containing a significant content of insoluble impurities is recovered in the present invention, by mechanical mining of a natural deposit of crude trona ore, to obtain mined trona ore that is processed further according to the ore crushing, beneficiation and drying operations of this invention.

The subterranean deposit of natural, crude trona ore is recovered via conventional dry mining techniques. Such dry mining techniques include mechanical mining of a subterranean trona ore deposit via room- and pillar mining or longwall mining or combinations of these or other conventional mining techniques, such as described in the Description of Prior Art section of U.S. Pat. No. 4,268,088 of Price et al. assigned to Texasgulf Inc. ("Shortwall Mining of Trona") and whose mining technique disclosures are hereby incorporated by reference.

Dry mining techniques typically involve shearing or mining trona ore from a deposit face using well-known mining equipment, e.g., longwall shearers (e.g., a double drum shearer-loader), longwall plows, continuous borers, continuous miners, or the like, and loading the pieces of trona ore onto haulage equipment, e.g., shuttle cars, conveyor belts, ore skips, or the like, to move the ore from the subterranean mining site to the surface, for further processing.

The subterranean mining operations may comprise crushing of the mined ore pieces in one or more steps, and sizing of the ore pieces, or both. For example, the mined trona may be broken into more uniform-sized pieces using equipment such as a feeder-breaker, before being transported out of the mine to the surface. Additional crushing and sizing operations may also be carried out as surface operations, after the mined ore has been transported to the surface for such further processing.

The subterranean mining ore recovery operations normally comprise the initial ore crushing operations, which include the shearing or mining of ore from the deposit face, optional crushing of the mined ore, e.g. in breakers or feeder-breakers, and optional sizing the mined or crushed ore, e.g., in sizers, to provide a coarsely-crushed or even a more precision-crushed and sized trona ore, suitable for further processing.

In the present invention, trona ore is mined from a natural deposit of crude trona ore, and the recovered trona ore is subjected to further processing in surface operations. The subterranean trona ore mining and recovery operations and the subsequent surface operations may be carried out in a continuous sequence of unit operations. Alternatively, the recovered mined trona ore may be stockpiled in an intermediate step, e.g., on the surface, prior to the recovered ore being subjected later to further processing, e.g., on an as-needed basis, according to the present invention.

The trona ore crushing step of this invention, as noted above, may be a single crushing step or may comprise multiple crushing steps. The crushing operation may take place in the mine or as part of the surface processing operations or both, in the case of multiple crushing steps.

The crushing of the mined trona ore, both coarse crushing and precision crushing and optionally sizing of the crushed ore, may be carried out using conventional mining or surface ore processing equipment designed to accomplish these objectives. Suitable crushers are well known to those skilled in the mineral ore processing art and may include feeder-breakers, sizers, impact crushers, roll crushers, hammer crushers or mills, ball mills, pin mills and the like.

Suitable ore sizing equipment is likewise well known and includes hard material separators, impact separators, vibratory screens, density or air classifiers and the like. Ore size techniques and equipment are discussed in more detail below, in connection with beneficiation of the crushed trona ore.

The term crushed trona is used to mean trona ore which has been mined and which may also have been subjected to a size reduction unit operation or sizing unit operation or both. The ore crushing operation of this invention may occur in subterranean ore processing, surface ore processing or both and comprises both initial crushing and preferential crushing (e.g., in association with the beneficiation operation).

Such crushed trona, as the term is used in this disclosure, is in the form of pieces, chunks, fragments and smaller-sizes of trona ore having a size less than about 1 foot in size. Crushed trona ore not only comprises large sizes of trona ore, e.g., fragments, pieces, chunks of trona, but also finely-sized particles (sometimes referred to as crusher dust or fines).

As used in this specification, the term trona particles is defined to cover a very broad range of trona sizes, including trona ore pieces, chunks, and fragments, mid-sized trona pieces and fine-sized trona particles. More specifically, trona particles comprise trona ore pieces having a size up to about 1 foot, down to micron-sized trona particles, e.g., in the 1 to 100 micron (μm) size range.

Large sized trona particles, e.g., pieces larger than about 3 inches in size, may be very irregular in shape; particle size in the case of irregularly shaped particles refers to the largest dimension of such particles. Particle size for mid-sized (less than about 3 inches) and finer particles may be determined by conventional sieving, as the nominal size of a wire screen or sieve with the designated size opening.

In the present invention, the term fines can mean particles produced during a crushing, milling or other size reduction operation that are a byproduct of producing the desired particle size, and such fines are substantially smaller in size than the mean particle size obtained from such crushing, milling, etc. For example, the fines in an initial crushing operation, e.g., during mining operations, may comprise relatively large particles. The term fines can also be used to characterize the product of a milling operation where the product particles are substantially all micron-sized particles.

The beneficiation, described in more detail below, effects a separation of the crushed trona ore particle population, to recover a trona-rich, impurities-depleted trona ore fraction that is subsequently dried to obtain the trona product of this invention.

Beneficiation of Trona Ore

In the present invention, the mined trona ore is recovered and crushed, as described above, and the crushed ore is then subjected to trona ore beneficiation, to obtain a trona-enriched and insoluble impurities-depleted fraction that is subsequently dried to produce the desired high purity dry particulate trona ore product of this invention.

The trona beneficiation operation may comprise a single beneficiation step or a combination of beneficiation steps, using the same or different types of beneficiation techniques, as described below. A common characteristic of these beneficiation techniques is that they are carried out as dry separations (although the trona may optionally be surface wetted) and are not wet separations carried out in a suspending liquid.

The beneficiation operation may comprise one or more of the following trona separation techniques, which are effective for separating a trona-rich, impurities-depleted trona ore fraction from the crushed trona ore that is used as feed to the beneficiation step: size separation, optical sorting (e.g., colorimetric and x-ray-based separation), electrostatic separation, magnetic separation and density separation.

The preferred beneficiation techniques in the method of this invention are size separation and optical separation. These preferred separation techniques may be used in combination with each other or in combination with one or more of the other separation techniques discussed below.

The crushed trona ore mixture is beneficiated, in the method of this invention, to recover trona-rich pieces, particles and fines having greater than the ore mixture average concentration of trona, i.e., sodium sesquicarbonate. This beneficiation is accomplished, in the present invention, without calcination of the crushed trona ore and, preferably, without a preliminary step or pre-beneficiation step of drying the crushed ore.

Beneficiation—Size Separation

Size separation of the crushed trona ore mixture is a highly effective and economical technique for beneficiating the crushed trona ore in this invention.

The crushed trona ore mixture, the inventor has discovered, may be size separated to beneficiate the ore and recover a trona-rich size fraction that is enriched in its trona (sodium sesquicarbonate) content, having greater than the original trona ore mixture average concentration of sodium sesquicarbonate.

The mined ore, as described above, is crushed in the initial ore processing to produce crushed trona ore of various sizes ranging from very large pieces, e.g., larger than about 6 inches, medium sized pieces, e.g., smaller than about 6 inches but larger than about ¼ inch, and small pieces, particles and fines, e.g. smaller than ¼ inch. The crushed trona ore comprises trona-rich pieces, particles and fines having greater than the crushed ore mixture average concentration of trona (i.e., sodium sesquicarbonate) and impurities-rich pieces, particles and fines having greater than the ore average concentration of insoluble impurities.

The inventor has discovered that crushing trona ore that contains a significant insoluble impurities content not only results in a size reduction in the mined trona ore but also creates a heterogeneous population of crushed trona particles that facilitates beneficiation of the crushed trona ore. The mixture of crushed trona particles obtained from crushing insolubles-containing trona ore comprises a population of different-sized particles, with some particles (trona-rich particles) being trona-enriched, impurities-depleted particles, e.g., having greater than the average trona concentration found in the as-mined trona ore, and other particles (impurities-rich particles) being impurities-enriched, trona-depleted particles, e.g., having greater than the average insoluble impurities concentration found in the as-mined trona ore.

The crushed trona ore mixture is preferably size separated to recover the fraction of larger sized trona ore pieces and particles. The trona ore size-selected pieces are preferably larger than about 8 mesh sieve in size, more preferably larger than about ¼ inch in size and most preferably larger than about ½ inch in size. Still larger sized trona ore pieces, e.g., larger than about 1 inch in size, are typically high in their trona (sodium sesquicarbonate) content and low in insoluble impurities content.

The inventor has discovered that, as the trona pieces within the size ranges noted above increase in size, the content or concentration of insoluble impurities decreases, providing recovered trona ore pieces that are trona-rich, having increased trona (sodium sesquicarbonate) content. The insoluble impurity contents of such trona pieces about 2 inches in size are typically about 5 wt %, and less than about 5 wt % as the size-separated pieces increase in size beyond about 2 inches.

The size separation of such larger trona pieces preferably includes a removal of smaller particles from the surfaces of these size-selected trona ore pieces. Such smaller particles typically contain a higher concentration of insoluble impurities and consequently are preferably removed.

Certain crushing and size reduction equipment is better suited for effecting the desired trona size distribution comprising larger particles and pieces that are trona-rich. Compressive crushers, e.g., roll crushers and jaw crushers, are particularly effective for accomplishing this objective. It is believed that compressive crushing of trona ore tends to break the ore along grain boundaries, where insoluble material is commonly located. Crushing tests appear to support this since insoluble material is concentrated within the finer material released from within the trona ore grain boundaries.

It should be recognized that the particle size target for the larger-sized trona-rich fraction will typically depend on the specific compressive crushing equipment being utilized. The preferred minimum particle size specifications noted above for the large-size trona-rich fraction may vary depending on the operating mode and compression-type size reduction equipment employed, but the trona-rich, impurities depleted size fraction will typically comprise larger particles than the impurities-rich, trona-depleted fraction.

By contrast, impact crushers, which do not function via a compressive mechanism, provide sizing and beneficiation results that are different from those obtained with compressive-type crushing equipment. Impact crushing and size separation can be used to beneficiate trona ore, but the trona-rich fraction obtained in such cases typically comprises smaller-sized particles, rather than the large-size fraction.

The recovered trona-enriched stream from an initial pass of the size separation can be subjected to additional separation steps for further removal of insoluble components from the initially-beneficiated trona ore stream, thus improving the purity of the recovered beneficiated trona ore product. The additional separation steps need not be via size separation; other trona beneficiation separation techniques described in this specification could also be used for such subsequent (or prior) trona separation steps.

Size separation techniques are effective for beneficiating crude trona ore in the method of the present invention and can effect removal or separation of at least about 10 wt %, more preferably, at least about 30 wt %, and most preferably, at least about 50 wt % of the insolubles present in crude trona ore being subjected to beneficiation.

Beneficiation—Optical Sorting

Optical sorting, e.g., colorimetric separation, of the crushed trona ore mixture is another highly effective technique for the beneficiation the crushed trona ore in the present invention.

Trona ore containing insoluble impurities, particularly oil shale, may be beneficiated by optical techniques, e.g., based on color sorting or light reflectivity of the crushed trona ore. Crushed trona ore pieces and particles that are off-white or light tan in color are typically trona-rich and impurities-poor. As the color of the trona becomes darker, e.g., brown, dark brown, and even gray or green, such colors typically indicate the presence of high concentrations of insoluble impurities, e.g., above about 7 wt % for lighter shades and above about 20 wt % for darker shades. The preferred trona-rich pieces and particles of trona ore are normally those having off-white, tan or very light brown coloration.

One prior art patent that discloses colorimetric separation or beneficiation of impurities-containing trona ore via colorimetric and related optical methods is U.S. Pat. No. 3,819,805 of Graves et al. U.S. Pat. No. 3,819,805 of Graves et al. is hereby incorporated by reference for its disclosures relating to optical sorting techniques for the beneficiation of trona ore.

The optical sorting trona beneficiation technique is not limited to colorimetric sorting of the trona ore mixture but also comprises infrared sorting, x-ray diffraction sorting, x-ray transmission sorting (based on atomic density) and other sorting techniques using electromagnetic radiation to measure reflectivity, transmissivity or absorption of the selected wavelength(s) or to measure fluorescence.

Mineral ore optical sorting equipment, suitable for use in beneficiating trona ore in the method of this invention, is available from several commercial sources, e.g., CommodasUltrasort GmbH, Hamburg, Germany (http://www.commodas-ultrasort.com), which markets optical sorting equipment that utilizes color, x-ray transmission and near infrared technologies. Optical sorting equipment that may be used for the beneficiation of trona ore in this invention is also disclosed in U.S. Pat. No. 4,236,640 of Knight which describes nahcolite ore sorters using an infrared light source, which is hereby incorporated by reference for those teachings.

Optical sorting and beneficiation of the trona ore mixture may be facilitated by water-wetting or water-misting of the trona ore mixture, which serves to highlight the colorimetric differences among the particles present in the mixture, as well as remove dust that may be present on the particle surfaces and adversely affect the colorimetric measurements. Removal of the dust could alternatively be accomplished via compressed air blasting of the trona ore mixture.

The recovered trona-enriched stream from an initial pass of the optical separation can be subjected to additional separation steps for further removal of insoluble components from the initially-beneficiated trona ore stream, thus improving the purity of the recovered beneficiated trona ore product. The additional separation steps need not be via optical separation; other trona beneficiation separation techniques described in this specification could also be used for such subsequent (or prior) trona separation steps.

Optical separation techniques are effective for beneficiating crude trona ore in the method of the present invention and can effect removal or separation of at least about 10 wt %, more preferably, at least about 30 wt %, and most preferably, at least about 50 wt % of the insolubles present in crude trona ore being subjected to beneficiation.

Beneficiation—Magnetic Separation

The mined, crushed trona ore may be beneficiated, in the present invention, via magnetic separation of insolubles from the crude trona ore to recover a trona-enriched fraction that is depleted in insoluble impurities, as compared with the trona ore feed stream. Trona (sodium sesquicarbonate) is non-magnetic so magnetic separation takes advantage of magnetic or magnetizable components (hereinafter collectively referred to as magnetic components) present in the insoluble impurities to effect beneficiation of the crude trona ore.

Preferred magnetic separation equipment for beneficiation of trona ore utilizes rare earth magnets, rather than induced magnets because (i) rare earth magnets produce a stronger magnetic field with a higher magnetic gradient, and (ii) operating costs for rare earth magnets are typically lower. Drum separators and roll separators may be employed, using the preferred rare earth magnets.

The ore feed is introduced to the top of a magnetic-containing drum or roll (or onto a belt carried by the magnetic-containing roll). The magnetic separators function by allowing the non-magnetic material (trona-rich and impurities-depleted) in the ore to fall downwards in natural trajectory, to the side of the rotating drum or roll, where it is collected. Magnetic material in the ore, on the other hand, is attracted to the drum shell or roll and is retained and pulled out of the path of the falling nonmagnetic material. The magnetic material is thereafter released from the drum shell or roller/belt and collected as it falls beneath the drum or roll.

The recovered trona-enriched stream from an initial pass of the magnetic separation can be subjected to additional separation steps for further removal of insoluble components from the initially-beneficiated trona ore stream, thus improving the purity of the recovered beneficiated trona ore product. The additional separation steps need not be via magnetic separation; other trona beneficiation separation techniques described in this specification could also be used for such subsequent (or prior) trona separation steps.

Magnetic separation techniques are effective for beneficiating crude trona ore in the method of the present invention and can effect removal or separation of at least about 10 wt %, more preferably, at least about 30 wt %, and most preferably, at least about 50 wt % of the insolubles present in crude trona ore being subjected to beneficiation.

Prior art patents that mention magnetic separation include U.S. Pat. No. 4,341,744 of Brison et al. (which mentions magnetic separation in combination with electrostatic separation of trona from impurities contained in the ore) and U.S. Pat. No. 7,473,407 and U.S. Pat. No. 7,770,735 of Phillip et al. (which describe a process for the magnetic separation of impurities from trona ore). U.S. Pat. No. 7,770,735 is hereby incorporated by reference for its disclosures relating to the magnetic separation of impurities from trona ore.

Beneficiation of trona ore containing insoluble impurities via magnetic separation obviously requires the presence of at least one magnetic component. Crude trona ore may contain any of several impurities that exhibit magnetic properties. One magnetic component often found in crude trona ore is glauconite, an iron potassium silicate sometimes called greensand. Only very low concentrations of glauconite need be present in the trona insoluble impurities in order for magnetic separation of trona from the insoluble impurities to be an effective trona beneficiation technique.

In the Green River Basin, some locations within the main bed or deposit of trona ore have been discovered to be essentially glauconite-free (and likewise free of other magnetic components), and such crude trona ore is not amenable to magnetic separation as a trona beneficiation technique in the present invention. Furthermore, the presence of Fe-containing components in trona ore, even at concentrations of 3-4 wt % Fe in the oil shale and mudstone, does not necessarily indicate that magnetic separation is feasible for the beneficiation of trona ore. However, the other beneficiation techniques described in this specification may be used to effect beneficiation of such glauconite-free crude trona ore deposits with good results.

Beneficiation—Electrostatic Separation

Beneficiation of mined, crushed trona ore may be effected via electrostatic separation or high tension separation using a high voltage gradient (collectively referred to as electrostatic separation for purposes of the present specification). The crushed trona ore is size separated to remove large particles and fines, yielding a crushed trona ore fraction that is then electrically separated into trona-enriched and insolubles-depleted fraction, via passage of the particles through an electrostatic separator. The electrostatic separation also produces an insolubles-enriched fraction having a depleted trona component.

The trona-rich particles in the crushed crude trona ore subjected to electrostatic separation are separable via electrostatic or high tension techniques since the insoluble components present in crude trona ore, particularly oil shale and mudstone, are more conductive (and more readily accepting of an electrical charge) than relatively-nonconductive pure trona. Electrostatic separation methods are based on subjecting the ore to conditions such that components of different electrical conductivities separate from each other. Electrostatic separation to effect beneficiation of trona ore in the present invention may be carried out using any conventional electrostatic separation technique and equipment used for such separations.

The recovered trona-enriched stream from an initial pass of the electrostatic separation can be subjected to additional separation steps for further removal of insoluble components from the initially-beneficiated trona ore stream, thus improving the purity of the recovered beneficiated trona ore product. The additional separation steps need not be via electrostatic separation; other trona beneficiation separation techniques described in this specification could also be used for such subsequent (or prior) trona separation steps.

Electrostatic separation techniques are effective for beneficiating crude trona ore in the method of the present invention and can effect removal or separation of at least about 10 wt %, more preferably, at least about 30 wt %, and most preferably, at least about 50 wt % of the more conductive insoluble impurities present in crude trona ore being subjected to beneficiation.

A process for the electrostatic enrichment of crushed, uncalcined trona ore is described in U.S. Pat. No. 4,341,744 of Brison et al. The electrostatic trona enrichment process described by Brison et al. '744 utilizes as feed crushed uncalcined trona ore having particles size less than about 4 mm in size, with fines (particles less than 0.1 mm in size) removed. These ore particles are then electrified to take advantage of the difference in electrical conductance between the trona and the impurities (primarily insolubles) in the process of Brison et al. '744. The teachings of U.S. Pat. No. 4,341,744 are hereby incorporated into the present specification by reference, for their disclosures relating to the electrostatic separation of trona from the insoluble impurities present in crude trona ore at col. 4, line 62 to col. 6, line 32.

Beneficiation—Density Separation

Beneficiation of mined, crushed trona ore may also be effected via dry density separation of the trona from the insolubles. Many of the trona ore insoluble impurities, e.g., oil shale have densities different from that of pure trona, whose density is 2.12 g/cm$^3$.

Oil shale, a major impurity present in crude trona ore, has mineral components whose density is about 2.8 g/cm$^3$. Shortite, a soluble impurity found in crude trona ore, has a density of 2.6 g/cm$^3$. Density separation employed in the trona ore beneficiation method of this invention is carried out as dry separation process; the crushed trona ore is not wetted in this unit operation.

Trona ore beneficiation via dry density separation is carried out by subjecting the crushed trona ore to conditions such that particles of different densities within the ore mixture are physically separated from each other, into two or more fractions of different densities. As noted earlier, trona ore is typically the lighter density fraction when separated from the ore impurities in the recovery of beneficiated trona ore.

Beneficiation of trona ore via density separation may be carried out using conventional density separation equipment used for dry separation of particulate solids of differing densities, e.g., air tabling devices or dry jigging devices or other analogous dry density separation devices, e.g., see U.S. Pat. No. 7,708,145 of Li et al.

The recovered trona-enriched stream from an initial pass of the density separation can be subjected to additional separation steps for further removal of insoluble components from the initially-beneficiated trona ore stream, thus improving the purity of the recovered beneficiated trona ore product. The additional separation steps need not be via density separation; other trona beneficiation separation techniques described in this specification could also be used for such subsequent (or prior) trona separation steps.

Dry density separation techniques are effective for beneficiating crude trona ore in the method of the present invention and can effect removal or separation of at least about 10 wt %, more preferably, at least about 30 wt %, and most preferably, at least about 50 wt % of the more dense particulate insolubles present in crude trona ore being subjected to beneficiation.

Drying of Trona

The trona drying step of this invention is carried out to achieve two objectives: reduction of the free moisture content of the dried trona product to less than about 0.1 wt % $H_2O$, and achievement of such product low moisture content without calcination of the trona (sodium sesquicarbonate) during the drying operation. As explained above, a key aspect of achieving these objectives is the reduction of the insoluble impurities content in the beneficiated trona, prior to the drying operation. The inventor has discovered that production of a trona product of this invention is facilitated by first beneficiating the trona, a step that promotes efficient drying of such trona, to yield a very low moisture content trona product that nevertheless is essentially uncalcined.

The drying operation is carried out under drying temperature and residence time conditions that avoid calcination of the beneficiated trona-rich ore fraction being dried. When calcination is minimized during drying, the dried trona product of this invention will exhibits a bicarbonate:carbonate ratio of at least about 0.75:1, more preferably, at least about 0.78:1.

The temperature of the trona-rich ore fraction being dried is maintained at a temperature that avoids calcination, even surface calcination, of the trona being dried. The temperature of the trona product during the drying operation is most preferably maintained at a solids temperature below about 130° F. The temperature of the hot air or other heating gas used to effect drying of the trona solids is typically higher than the trona solids temperature; heating gas temperatures of about 130° F. to about 350° F. are representative for fluid bed dryers. Furthermore, the heating gas should have a low moisture content, to promote rapid evaporative removal of free moisture from the trona being dried.

The inventor has discovered, however, that the trona product temperature may be allowed to exceed 130° F., even up to about 170° F., or higher, without calcination occurring during drying of the trona product. When such higher drying temperatures (above about 130° F.) are employed in the drying procedure, the dried trona is preferably subjected to a cooling step to prevent post-drying operation calcination from occurring in the hot trona product. The cooling step preferably lowers the temperature of the dried trona product to about 110° F. or less. In addition, the heat removed from the dried trona in the cooling step is preferably recovered for reuse, in preheating of the air or other heating gas used in the drying operation.

The residence time of the trona being dried is likewise maintained at a time sufficiently short to avoid calcination from occurring in the trona product being dried.

Residence times will depend on the equipment being used, e.g., flash dryers typically requiring shorter residence times than fluidized bed dryers, to achieve equivalent drying of a trona product. Suitable residence times normally range from a few seconds to several minutes, and such times are generally sufficient to provide the desired low residual free moisture desired in the trona product, without unwanted calcination occurring during the drying operation.

During drying of the trona-rich beneficiated trona fraction, the evaporative removal of bulk free moisture has been observed to occur rapidly, and substantially complete removal of the bulk free moisture is often evidenced by a more rapid increase of the trona solids temperature, towards the temperature of the heating gas. Removal of bulk moisture is typically removed quickly at trona solids temperatures of about 70° F. to about 105° F., depending on gas temperature and gas flow rates of the heating gas employed.

Removal of adsorbed or absorbed free moisture from trona ore has been observed to be more difficult, having a lower evaporation rate and requiring higher trona solids drying temperatures than those noted for removal of bulk free moisture or longer exposure of the trona solids to the drying gas. Both of these can increase the likelihood of unwanted calcination occurring in the trona being dried. This observation underscores the importance and desirability of removing insoluble impurities in trona, in the method of this invention, before the trona drying operation is carried out. Clearly, the presence of a significant insolubles content in trona normally increases the amounts of adsorbed or absorbed free moisture present in the trona ore and thus increases the difficulty of drying such trona to the desired low residual moisture contents without calcining the trona.

Drying equipment suitable for drying the trona-rich fraction of beneficiated trona includes solids dryers well known to those skilled in the art and includes fluidized bed dryers, flash dryers, rotary kiln dryers, pneumatic conveying dryers, oven dryers, tumble dryers and the like. The drying equipment preferably employs a heated gas stream to effect drying of the trona-rich fraction, to provide more precise control of the drying conditions (e.g., heating gas temperature and trona product temperature). Alternatively, indirect heating techniques may be used for heating and drying the trona ore, in lieu of a heated gas stream.

The dryer heating gas may be air or combustion gas, the latter normally being diluted, cooled or otherwise temperature-adjusted to provide the desired heating gas temperature. The heated air or other heated gas used as dryer heating gas should be low humidity gas (low in moisture content) to facilitate drying of the trona to the desired very low moisture content. In addition, the heating gas should be generally inert with respect to the trona being dried (e.g., combustion gas that does not contain $SO_X$ or other trona-reactive components).

The drying operation that is carried in the method of this invention is preferably a single operation to effect drying of the trona-rich fraction and is preferably the only trona drying operation carried out on the mined trona ore to remove free moisture from the mined and beneficiated trona.

Trona Product Particle Sizing

The trona product of this invention is particularly well suited for as a sorbent in dry injection-type air pollution control operations. The trona sorbent product is injected or otherwise introduced in dry form, as a particulate solid into a contaminant-containing gas stream (e.g., $SO_X$— or HCl— or other acidic gas-containing or Hg-containing gas stream). The trona sorbent product is preferably utilized as a particulate solid in finely-divided form, most preferably as extremely fine particles.

The trona sorbent product should have a relatively small particle size in order to maximize the surface-to-volume ratio, i.e., thereby enhancing the effectiveness of the gas-solid interaction between the $SO_X$ (or other contaminant) and dry particulate trona sorbent.

The mean particle size of the particulate trona product of this invention is preferably less than about 100 µm, when such trona is intended for use as a dry injection sorbent. The mean particle size of the trona sorbent is preferably less than about 75 µm, more preferably less than about 50 µm, and most preferably less than about 40 µm. In addition, substantially all (90% or more, by volume) of the trona sorbent particles are preferably less than about 70 µm and, more preferably, less than about 50 µm in size.

In situations where the trona product of this invention is intended for use in applications other than dry injection pollution control operations, the particle sizing of the trona product may be more coarse than the preferred sizing for trona sorbent applications. In such cases, the trona product preferably has a mean particle size less than about 8 mesh and preferably less than about 50 mesh.

Conventional size reduction and sizing equipment may be used to achieve these trona product and trona sorbent product preferred particle size specifications. Such equipment is well known to those skilled in conventional trona processing and soda ash production.

Optional Milling and Milling/Drying

An optional step in the present invention is milling of the beneficiated trona, i.e., the trona-rich, impurities-depleted trona fraction, to obtain a reduced particle sizing for the trona product. The milling step is particularly useful if the beneficiated trona fraction does not possess the desired particle sizing desired for the dried trona product of the present invention and permits more precise control of the particle sizing obtained for the trona product. Such milling is particularly applicable to the production of trona product intended for use as dry injection trona sorbent.

A preferred embodiment of this invention, discussed in more detail below, involves carrying out the milling step concurrently with the drying of the trona-rich fraction. Such combined milling and drying typically avoids the need for a separate, additional drying operation, providing the advantage of further significant cost savings in the method of this invention.

In the optional milling step of this invention, conventional grinding or milling equipment can be employed to achieve the desired trona product particle size objectives. The milling of the dry sorbent may be carried out using conventional solids milling equipment such as hammer mills, roller mills, impact mills, ball mills, pin mills or the like, typically in combination with a solids air classifier or other particle size classifier.

The trona-rich, impurities-depleted trona fraction subjected to the optional milling step typically has a particle size greater than about 100 µm prior to milling. The trona-rich fraction employed as the feed to the milling step typically has been subjected to intermediate particle size reduction of the crushed and beneficiated trona, prior to the milling step.

The optional milling step is especially useful for achieving the product particle size specifications desired for trona product intended for use as a dry injection trona sorbent. The milling step is desirably operated to produce a milled and sized trona that has a mean particle size less than about 75 µm, more preferably less than about 50 µm, and most preferably less than about 40 µm. In addition, substantially all (90% or more, by volume) of the trona sorbent particles are preferably less than about 70 µm in size.

An especially preferred embodiment of this invention involves carrying out the optional milling step and the drying step concurrently. Such concurrent milling and drying operations are preferably carried out by employing unheated or heated air or other gas (e.g., combustion gas from a natural gas burner) as a sweep gas stream in the milling step, to achieve three objectives: prevention of the in-process milled trona from becoming overheated; maintaining the in-process milled trona at temperature conditions that result in drying, without calcination, of the milled trona; and removal of the milled product from the milling chamber. The milling sweep/drying gas may also have a low moisture content, to facilitate rapid and complete drying of the in-process milled trona.

Such concurrent milling and drying readily achieves the desired drying specification for the trona product of this invention, less than 0.1 wt % free moisture for the dried and milled trona product, as well as the preferred trona product moisture content targets well below 0.1% wt $H_2O$.

The concurrent milling and drying is carried out at a temperature that avoids calcination occurring in the milled and dried trona product, and the drying temperature of the in-process milled trona solids is preferably maintained below about 130° F. However, higher drying temperatures are also feasible, e.g., up to about 170° F. for the trona solids, provided that the milled and dried trona product is cooled immediately upon its removal from the milling and drying operation.

The drying operation that is carried out as part of the concurrent milling and drying of the trona-rich fraction is preferably the sole trona drying operation to remove free moisture from the mined and beneficiated trona.

Dry Injection Pollution Control Applications—Flue Gas Desulfurization

The dry uncalcined trona product of this invention is particularly well suited for use in dry injection pollution control, such as dry sorbent injection flue gas desulfurization operations. The relatively high purity and low calcination of the trona ore product of this invention are characteristics that are particularly advantageous in its use for treatment of contaminants in combustion flue gas streams.

The beneficiated trona product of this invention is a dry solid that is characterized by its reactive capability, when injected into, or introduced into, or otherwise contacted with a gas stream containing one or more pollutants such as $SO_2$, $SO_3$ (collectively $SO_X$), HCl and other acid gas contaminants, and Hg. The dry-injected trona sorbent of this invention reacts or otherwise combines with $SO_X$ or other contaminants present in the gas stream to effect removal of such $SO_X$ and other components from the treated gas stream.

The trona sorbent made by the method of this invention is especially well suited for dry injection pollution control of gas streams since its very high content of sodium sesquicarbonate, the active ingredient, facilitates treatment of the gas stream with very high sorbent utilization per unit weight of sorbent. The trona product of this invention appears to function as a highly efficient sorbent via calcination or activation of the sodium sesquicarbonate during exposure of the sorbent to the hot gas stream being treated.

This calcination of the trona in the hot gas stream appears to activate the trona by creating enhanced porosity or surface area or both, apparently by decomposition of the sodium bicarbonate moiety of sodium sesquicarbonate and removal of the waters of hydration associated with sodium sesquicarbonate. If trona is activated by calcination, even to a small extent, well prior to its injection into a gas stream, the activated surface area is vulnerable to degradation during shipping and storage of the partially calcined product, lessening its reactivity and effectiveness as a dry injection sorbent.

The desulfurization process of this invention is carried out by injecting the trona sorbent into a flue gas stream containing a pollutant whose removal is the desired objective. In the discussion which follows, the exemplified pollutant is $SO_X$ although the procedure is essentially the same for the dry injection removal of other contaminants in a stationary combustion flue gas stream or in other contaminant-containing gas streams.

The trona sorbent is normally injected into the $SO_X$-containing flue gas stream being treated upstream of the point where solids collection devices are located. The terms injection and injecting, as used in this specification, are intended to encompass other means of introducing or otherwise contacting the trona sorbent with the flue gas stream to be treated. For example, the trona sorbent may be contacted with the flue gas stream by loading or introducing the sorbent onto the fabric bags of a bag filtration solids collection device through which the flue gas stream passes, such that the trona sorbent is in contact with the $SO_X$-containing flue gas stream during the bag filtration collection cycle.

The trona sorbent is injected into the $SO_X$-containing flue gas stream, which is at a temperature sufficient to provide activation of the trona sorbent and reaction of the sorbent with the $SO_X$ component being targeted for removal.

The temperature of the flue gas stream at the trona sorbent injection point is normally within the range of about 200° F. to about 1100° F. and, more preferably, is about 250° F. to about 900° F. These flue gas stream temperatures promote efficient reaction of the injected trona sorbent with $SO_X$ in the flue gas stream, to remove at least a portion of the $SO_X$ from the flue gas by the solid sorbent's reaction with the $SO_X$ in the flue gas stream.

Factors that affect the calcined sorbent $SO_X$ removal efficiency include not only flue gas temperature but also residence time, sorbent sizing, sorbent injection rate and/or amount, sorbent-flue gas mixing, and flue gas $SO_X$ concentration.

The trona sorbent is injected as a dry particulate solid into the $SO_X$-containing flue gas stream using conventional solids injection equipment, e.g., a screw conveyor, rotary lock valve with blower or other pneumatic injection device, with the proviso that uniform dispersal of the dry trona sorbent throughout the flue gas stream (or uniform contact of the sorbent with the bulk of the gas stream) is desired, to ensure efficient interaction between the trona sorbent and the $SO_X$ in the flue gas stream.

The entrained solids in the flue gas stream, following the trona sorbent injection to react with $SO_X$ contaminants, normally include sodium sulfite and sodium sulfate reaction products and unreacted or partially reacted sorbent. In addition, the flue gas stream may also contain fly ash and other combustion byproduct solids from the fuel combustion upstream, if the fly ash has not previously been removed.

All of these entrained solids in the flue gas stream may be captured downstream using the solids recovery equipment normally used in a flue gas pollution control system. Such solids-collection devices include conventional electrostatic precipitators or baghouse filters, typically used to remove fly ash and other solids from a flue gas stream. Alternatively, a wet scrubbing apparatus could be used to collect the spent sorbent in the treated flue gas stream.

Residence time required for the injected trona sorbent to be in contact with the $SO_X$-containing flue gas stream is normally very short. Residence times of a fraction of a second up to about 2 to about 3 seconds are normally sufficient.

The amount of trona sorbent introduced into and contacted with the flue gas stream desirably provides at least a stoichiometric amount of Na with respect to the amount of $SO_X$ in the flue gas stream that is being targeted for removal, e.g., $SO_2$ or $SO_3$ or both. It should be noted that the amounts of calcined sorbent referred to in this specification are based on the amount of $SO_X$ targeted to be removed: if the flue gas stream contains 30 ppm $SO_3$ and 50% is targeted for removal, then the stoichiometric amount of calcined sorbent utilized is based on the sodium required to remove 15 ppm $SO_3$ (i.e., 50% of 30 ppm).

The amount of injected dry trona sorbent preferably provides at least about two moles of sodium (Na) based on the amount of targeted $SO_X$ to be removed from the flue gas stream. The amount of injected dry trona sorbent employed in flue gas desulfurization may be increased if desired, to provide a greater stoichiometric excess and increase the percentage removal of $SO_X$ from the treated gas stream, but such trona sorbent is likely to be underutilized, i.e., the trona sorbent will not be fully reacted, decreasing its utilization efficiency.

The trona sorbent flue gas desulfurization process of this invention provides excellent $SO_X$ removal efficiencies, particularly using the preferred operating parameters described above. Generally, if at least a stoichiometric amount of trona sorbent is adequately mixed with the $SO_X$-containing flue gas at the desired temperature and is given an adequate residence time, then satisfactory $SO_X$ targeted removal efficiencies will be achieved.

As mentioned earlier, the relatively high purity and low calcination of the trona ore product of this invention are especially advantageous in its use as a sorbent for treatment of contaminants in combustion flue gas streams. First, the high sodium sesquicarbonate content of the beneficiated trona maximizes the amount of active ingredient (sodium sesquicarbonate) per unit weight of trona product, providing a highly efficient agent for contaminant removal. Second, the trona product is essentially uncalcined, maximizing the amount of sodium sesquicarbonate in the sorbent available for activation. Third, the low moisture of the trona product facilitates storage and distribution of this sorbent product, minimizing the likelihood of flowability issues.

In addition, flue gas treatment facilities that sell their byproduct solids, e.g., fly ash for cement production or calcium sulfate for wall board production, often wish to limit the amount of sodium salt in the collected solids (e.g., fly ash, calcium sulfate and spent/reacted trona product). The high contaminant-scavenging efficiency of the trona product of this invention results in a reduced amount of spent trona collected with the fly ash, as compared with use of crude trona ore of lesser purity.

The trona product of this invention is also suited for other end-use applications, besides as a sorbent in dry injection pollution control of contaminant-containing gas streams, where there is a commercial need for an economical, high purity, essentially uncalcined trona product having a very low moisture content.

The following non-limiting Examples illustrate aspects of the present invention.

EXAMPLES

Example 1

In Example 1, trona ore recovered from subterranean mining of a trona ore deposit was analyzed for its impurities content as a function of the size of the trona pieces. The trona ore used in this Example 1 was simply trona ore obtained and processed via the upstream crushing equipment, e.g., longwall shearers, underground breakers and sizers, and primary roll crushers. This crushed ore had a wide range of particle sizes, ranging from pieces larger than 3 inches to small particles less than 8 mesh in size.

In the study for this Example 1, about three tons of trona ore in 112 collection buckets was collected over several weeks of mining operations and of reclaiming stockpiled trona. Representative samples of trona ore from the collection buckets were separated into size fractions that were analyzed for insoluble impurities content (% by weight of the crude trona ore). The analyzed insolubles levels were based on the weight of the undried and uncalcined trona ore, i.e., ore weight including moisture.

The ten trona ore size fractions in this study were as follows: greater than 2.5 inches; 2 to 2.5 inches; 1.5 to 2 inches; 1 to 1.5 inches; ¾ to 1 inch; ⅝ to ¾ inch; ⅜ to ½ inch; ¼ to ⅜ inch; ¼ inch to greater than 8 mesh; and less than 8 mesh.

Results of these insoluble impurities analyses as a function of size fraction are shown in FIG. 1. The results show that the largest size fractions, 2 inches or larger, exhibited the lowest insolubles content, 5 wt % or less.

As the size fractions decreased in size, the insolubles content of the trona ore fractions progressively increased, as shown in the graph of FIG. 1. For size fractions less than 1 inch, the insolubles content was 10 wt % or higher, and with size fractions progressively less than ½ inch, the insolubles content increased from about 14 to about 16 wt %.

The results of the study in this Example 1 demonstrate that mined and crushed trona ore is not a mixture of homogeneous particles and, further, that beneficiation of crushed trona ore can be effected via size fraction separation of trona ore obtained during initial crushing operations, into trona ore size fractions that are trona-rich and impurities-depleted. This beneficiation by crushing and size separation is not limited to initial crushing operations, but can be seen in a variety of crushing operations and ore sizes.

Example 2

In Example 2, mined and crushed trona ore was subjected to beneficiation via two optical beneficiation techniques, colorimetric sorting and x-ray transmission sorting, using equipment provided by CommodasUltrasort (Hamburg, Germany). Several size fractions of trona ore were tested, ranging from ⅜-½ inch (the smallest) to 2-3 inches (the largest). Both color sorting and x-ray transmission sorting were demonstrated to be effective for separating trona-rich, insolubles-poor trona particles from insolubles-rich particles in each of the fractions tested.

The equipment functions in a manner similar to most optical sorters, with the crushed trona ore being fed in a monolayer from a vibratory feeder, free-falling off the feeder chute past a camera (in the case of colorimetric sorting) whose sensitivity may be adjusted. The camera determines whether an individual particle passes the lightness threshold, in which case the particle drops into the accepted container. Particles that fail the lightness test are deflected from their falling trajectory by an air blast into a rejected container.

The results of this testing are shown in Table 1 below, which lists each trona size fraction (six for the colorimetric tests; five for the x-ray transmission (XRT) tests); the percentage (wt %) of insolubles present in that size fraction, on average; the percentage of the feed fraction that was rejected and percentage insolubles content; the percentage of feed fraction that was accepted and with percentage insolubles content; and the overall percentage beneficiation effected for each fraction.

TABLE 1

| Test | Size (inches) | Input Trona Ore Insolubles | Rejected Trona Ore Trona | Rejected Trona Ore Insolubles | Accepted Trona Ore Trona | Accepted Trona Ore Insolubles | Beneficiation (%) |
|---|---|---|---|---|---|---|---|
| XRT | 2-3 | 11.5% | 23.6% | 38.3% | 76.4% | 3.2% | 72% |
| XRT | 1.5-2 | 6.4% | 39.8% | 12.6% | 60.2% | 2.5% | 62% |
| XRT (low sensitivity) | 1.5-2 | 6.2% | 12.2% | 22.3% | 87.8% | 3.6% | 42% |
| XRT | 1-1.5 | 8.6% | 23.4% | 29.5% | 76.6% | 2.2% | 75% |
| XRT | ¾-1 | 11.6% | 23.4% | 40.6% | 76.6% | 2.5% | 78% |
| XRT | ½-¾ | 10.4% | 20.8% | 35.4% | 79.2% | 4.1% | 61% |
| XRT | ⅜-½ | 13.4% | 31.4% | 27.5% | 68.6% | 6.4% | 52% |
| Color | 1.5-2 | 7.9% | 41.0% | 21.0% | 59.0% | 1.3% | 83% |
| Color | 1-1.5 | 9.1% | 40.4% | 22.1% | 59.6% | 1.3% | 86% |
| Color | ¾-1 | 10.6% | 35.3% | 23.9% | 64.7% | 1.7% | 84% |
| Color | ½-¾ | 11.8% | 38.8% | 31.6% | 61.2% | 2.0% | 83% |
| Color | ⅜-½ | 14.2% | 25.5% | 48.4% | 74.5% | 3.3% | 77% |

One size fraction, 1.5-2 inches in size was also subjected to a second x-ray transmission sorting, using a lowered rejection threshold (the row designated "XRT (low sensitivity)"), which provided a higher recovery of accepted trona ore, albeit with lesser purity, i.e., slightly higher insolubles content and a lower overall beneficiation percentage.

For the x-ray transmission sorting (XRT) testing, the average beneficiation was very good at 67% with 73% recovery of feed trona ore (excluding the low sensitivity XRT run). The insolubles contents of the beneficiated trona fractions ranged from a low of 3.2 wt %, for the largest size fraction: 2-3 inches, to a high of 6.4 wt %, for the smallest size fraction: ⅜-½ inch. Insolubles contents of the trona ore used as feed ranged from about 6 wt % to 14 wt %, the smaller sized fractions generally having higher insolubles contents in the feed material.

For the color sorting testing, results were even better. The average beneficiation was 82% with 64% recovery of feed trona ore. The insolubles contents of the beneficiated trona fractions ranged from a low of 1.3 wt %, for the largest size fraction: 1.5-2 inches, to a high of only 3.3 wt %, for the smallest size fraction: ⅜-½ inch. Insolubles contents of the trona ore used as feed ranged from about 6 wt % to about 14 wt %, the smallest sized fraction having the highest insolubles content.

Figure 2:
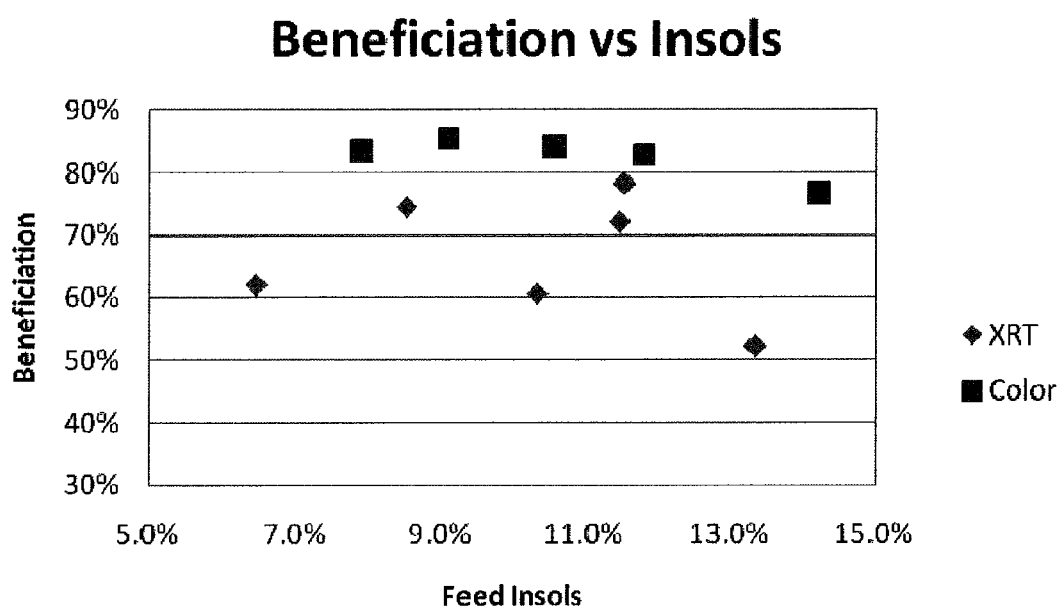
FIG. 2 is a plot of trona ore beneficiation results carried out using colorimetric sorting and x-ray transmission sorting, showing the percentage beneficiation achieved for trona ore feeds having insoluble impurities ranging from about 6 wt % to about 14 wt %.

The beneficiation results shown in Table 1 are summarized in graphical form in FIG. 2, which plots beneficiation as a function of the trona ore feed insolubles contents, for both color sorting (square data points) and x-ray transmission sorting (diamond data points). The graphical results in FIG. 2 show that trona beneficiation based on colorimetric sorting gave more consistent results than beneficiation based on x-ray diffraction. However, both optical beneficiation techniques provided very good beneficiation of crushed trona ore across the entire range of trona size fractions evaluated.

Example 3

Example 3 illustrates the adverse impact of the trona ore insoluble impurities content on the final residual free moisture content achieved during drying of trona ore under otherwise uniform drying conditions. Samples of trona ore containing a range of insolubles contents were subjected to moisture analysis by weight loss during drying via one of two different methods: drying in a laboratory oven for two hours at a temperature of 38° C. (100° F.), which was found to result in no appreciable calcination of the trona/sodium sesquicarbonate in the dried ore, and drying using a laboratory desiccator containing calcium sulfate as the desiccant for six hours at ambient temperature, about 20-25° C. (about 68-77° F.).

Figure 3:
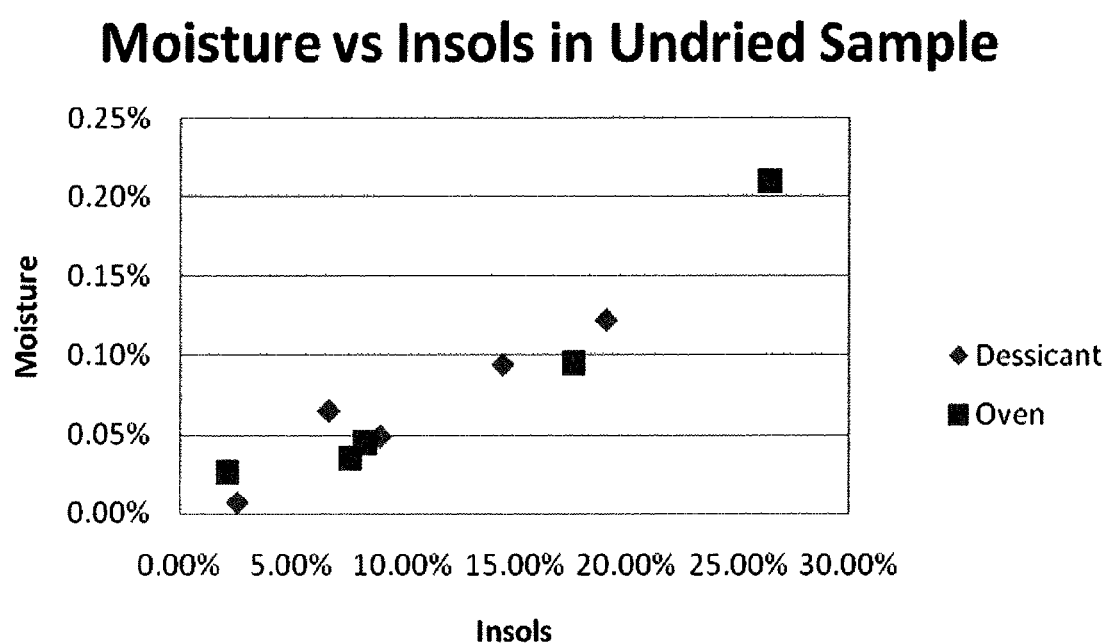
FIG. 3 is a plot of trona free moisture contents as a function of insolubles contents of undried trona ore samples, showing that trona ore samples exhibited higher free moisture contents as the insolubles contents increased. Two drying procedures were used, oven drying and desiccant drying, to measure free moisture in the trona samples

Results of the drying study of this Example 3 are shown in FIG. 3, which plots the final free moisture of the dried trona ore samples as a function of the samples' insolubles contents.

In this Example, trona ore samples were obtained from a grab sample of mined and crushed trona ore that had not been previously dried. The trona ore grab sample amount was approximately 170 grams, and the trona ore sizing of the sample was between about +8 mesh to about ¼ inch.

The trona ore sample was then sorted visually by color into ten groups of about ten grams each, ranging in color from light (off-white) to dark (white-brown). As confirmed by subsequent analyses, the light colored trona ore samples were lower in insolubles content than the darker colored trona samples, and the samples ranged from 2 wt % to about 27 wt % insolubles.

Five trona ore samples covering the light-to-dark color spectrum were subjected to oven drying and the remaining five, to desiccant drying. The residual free moisture contents of the trona ore samples were determined at the conclusion of the drying tests, as were the insolubles contents of the dried trona samples.

As shown by the results in FIG. 3, the two drying techniques, desiccant drying (diamond-shaped data points) and oven drying (square data points), yielded similar final residual free moisture contents for trona ore samples with essentially identical insolubles contents. In addition, as the insolubles contents of the trona ore samples increased, the final residual free moisture contents achieved also increased, as shown in FIG. 3.

For high insolubles contents, e.g., 15 wt % or higher in the trona ore samples, the final residual free moisture contents were about 0.1 wt % $H_2O$ or higher. As the insolubles content decreased in the trona samples, lower final residual free moisture contents were achieved under otherwise identical drying conditions. For trona samples having between 5-10 wt % insolubles, the residual free moisture contents were about 0.04-0.06 wt % $H_2O$. At the lowest insolubles content, i.e., trona ore samples having about 3 wt % insolubles, the residual free moisture contents were below about 0.03 wt % $H_2O$, all as shown by the results in FIG. 3.

The drying results shown in FIG. 3 indicate the adverse impact of significant insolubles contents on the ability of a drying process to remove free moisture from such trona ore, as well as the decreased drying efficiency with higher insoluble impurities contents for such trona ore.

For the highest purity trona samples, it should be noted that the initial free moisture contents of the undried trona samples were determined to be relatively low, so that little or no drying was needed to achieve a residual free moisture content of no more than 0.05 wt % $H_2O$.

Example 4

Example 4 illustrates the positive impact of low ore insolubles on the drying times of such beneficiated trona ore and, conversely, the adverse impact of ore insolubles on the drying times of trona ore having significant insolubles content. The first two drying runs described below utilized beneficiated trona ore with a relatively low insolubles content, about 1 wt %. The third drying run utilized trona ore with a high insolubles content, about 15 wt %.

Mined trona ore was visually beneficiated by selecting light colored wetted trona ore pieces. The selected trona pieces were then crushed further and sized, to provide trona ore having an insolubles content of about 1.09 wt % and a relatively low moisture content of 0.09 wt % $H_2O$. The low initial moisture content was believed attributable to the low insolubles content of the trona ore. The beneficiated trona ore had a particle sizing of −¼ inch.

In the first drying run, a 1.5 kg sample of beneficiated trona ore was dried in a vibrating fluid bed dryer having a diameter of about 4 inches using fluidizing air at 176° F. and at an air flow rate of 41-51 kg/hr. The trona ore was dried for 3.0 minutes. During the drying run, the trona solids temperature rose from ambient to a temperature of 143° F. at the end of the run. Analysis of the trona ore recovered from this drying run indicated its moisture level had been reduced from 0.09 to 0.012 wt % $H_2O$ and remained uncalcined, having an average bicarbonate:carbonate ratio of 0.813.

In the second drying run, another 1.5 kg sample of the same trona ore used in the first drying test was dried in the fluid bed dryer using fluidizing air at 248° F. (compared to 176° F. in the first run) and at the same air flow rate as previously. The trona ore was dried for 2.5 minutes (compared to 3.0 minutes in the first run). In a manner similar to that of the first run, the trona solids temperature rose from ambient to a temperature of 149° F. at the end of the run. Analysis of the trona ore recovered from this second drying run indicated its moisture level had been reduced from 0.09 to 0.017 wt % $H_2O$ and remained uncalcined, having an average bicarbonate:carbonate ratio of 0.803.

In the third drying run, mined and crushed trona ore was not beneficiated. The trona ore insolubles content was about 15 wt % and the initial moisture content was not measured but was greater than 0.24 wt % $H_2O$ (a moisture content of 0.24 wt % was analyzed for the trona after two minutes into the drying run.) The trona ore for this third run was slightly larger in particle size than in the previous two runs, having a sizing of −½ inch.

For the third run, a 1.4 kg sample of unbeneficiated trona ore was dried in a different vibrating fluid bed dryer but still having a diameter of about 4 inches and otherwise operated in a manner similar to the first run, using fluidizing air at 176° F. and at a flow rate of 51 kg/hr. The trona ore was dried for 5.0 minutes (compared to 3.0 and 2.5 minutes in the first two runs). During the third drying run, the trona solids temperature was 162° F. at the end of the run. Analysis of the trona ore recovered from this drying run indicated its moisture level had been reduced to 0.028 wt % $H_2O$ and appeared to be uncalcined, with no visible surface calcination evident.

In the three drying runs of this Example 4, the removal rates of adsorbed water have been quantified, as discussed below. In previous drying tests (data not shown), the temperature and moisture profiles showed a fairly rapid removal of bulk free water during the initial portion of the drying process. The removal of bulk water was then followed by the slower removal of adsorbed water during the latter portion of the runs. However, in these other tests, the solids temperature of the trona would often rise or calcination would be seen before all of the adsorbed moisture was removed.

The drying water removal rates for the three runs of this Example 4 were evaluated for the adsorbed water removal, in the latter portion of the runs. The rate of adsorbed water removal in the third run (using unbeneficiated trona with 15 wt % insolubles) is shown to be substantially slower than the analogous water removal rates for the first two runs (using beneficiated trona containing 1 wt % insolubles). This comparison is summarized in the following Table 2 below. The drying times and moisture content spans are based on intervals during the latter part of the drying runs for which solid trona moisture analyses were obtained.

TABLE 2

| Run | Moisture Content Span | Drying Time | Drying Rate |
|---|---|---|---|
| 1 | 0.088 to 0.037 wt % $H_2O$ | 30 sec | ~0.1 wt % $H_2O$/min |
| 2 | 0.088 to 0.036 wt % $H_2O$ | 15 sec | ~0.2 wt % $H_2O$/min |
| 3 | 0.13 to 0.028 wt % $H_2O$ | 150 sec | ~0.04 wt % $H_2O$/min |

These data suggest that high insolubles content trona ore would require long residence times during drying, and it is unclear whether the low final moisture content obtained for the third run could be replicated in other cases, particularly without unwanted calcination (cf Example 3 above showing high residual moisture contents for high insolubles content trona).

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A method of producing trona suitable for dry injection pollution control comprising
   mechanically mining a trona ore deposit containing at least about 5 wt % insoluble impurities;
   crushing the mined trona ore to create a mixture of uncalcined trona ore particles comprising trona-rich particles and impurities-rich particles;
   beneficiating the crushed uncalcined trona ore, via a dry separation procedure selected to recover trona-rich particles larger than about ¼ inch in size, wherein the dry separation procedure is selected from the group consisting of density separation, magnetic separation, electrostatic separation, optical separation, x-ray imaging separation, infrared imaging separation and combinations of these, without prior drying of the unbeneficiated ore and the trona-rich particles larger than about ¼ inch in size, to obtain a trona-rich, impurities-depleted ore fraction; and
   then drying the trona-rich impurities-depleted ore fraction under non-calcining conditions to yield a dry uncalcined trona ore containing less than about 0.1 wt % free moisture.

2. The method of claim 1 wherein the mined trona ore contains an average of at least about 10 wt % insoluble impurities.

3. The method of claim 1 wherein the beneficiation comprises at least two beneficiation operations.

4. The method of claim 1 wherein the size separation beneficiation recovers trona-rich particles larger than about 1 inch that are size-separated from smaller impurity-rich particles.

5. The method of claim 1 wherein the beneficiated trona-rich, impurities-depleted ore fraction contains less than about half of the insoluble impurities content of the mined trona ore.

6. The method of claim 1 wherein the beneficiated trona-rich, impurities-depleted ore fraction contains less than 5 wt % insoluble impurities.

7. The method of claim 1 wherein the beneficiated trona-rich, impurities-depleted ore fraction contains less than 3 wt % insoluble impurities.

8. The method of claim 1 wherein the trona-rich, impurities-depleted ore fraction is dried using a heated gas stream, with the trona solids being maintained at a temperature that avoids calcination of the trona during drying.

9. The method of claim 1 wherein the trona-rich, impurities-depleted ore fraction is dried using a heated gas stream, with the trona solids being maintained at a temperature below about 130° F.

10. The method of claim 8 wherein the trona-rich, impurities-depleted ore fraction is dried using a dryer selected from the group consisting of fluid bed dryers, flash dryers, rotary kiln dryers, pneumatic conveying dryers, oven dryers and tumble dryers.

11. The method of claim 1 wherein the trona-rich, impurities-depleted ore fraction is dried to yield a trona product containing less than about 0.05 wt % free moisture.

12. The method of claim 1 wherein the dried trona-rich, impurities-depleted ore fraction has a weight ratio of $NaHCO_3:Na_2CO_3$ of at least about 0.75:1.

13. The method of claim 1 wherein the dried trona-rich, impurities-depleted ore fraction has a weight ratio of $NaHCO_3:Na_2CO_3$ of at least about 0.78:1.

14. The method of claim 1 which further comprises milling the trona-rich, impurities-depleted ore fraction to provide particulate trona sizing having a mean particle size that is less than about 100 microns.

15. The method of claim 1 which further comprises milling the trona-rich, impurities-depleted ore fraction to provide particulate trona sizing having a mean particle size that is less than about 50 microns.

16. The method of claim 14 wherein the trona-rich, impurities-depleted ore fraction subjected to the milling step is concurrently contacted with a sweep gas stream during milling to effect drying of the milled trona-rich ore fraction.

17. A method of producing trona suitable for dry injection pollution control comprising
   mechanically mining a trona ore deposit containing at least about 5 wt % insoluble impurities;
   crushing the mined trona ore to create a mixture of uncalcined trona ore particles comprising trona-rich particles and impurities-rich particles;
   beneficiating the crushed uncalcined trona ore, via a dry separation procedure selected to recover trona-rich particles larger than about ¼ inch in size, wherein the dry separation procedure is selected from the group consisting of density separation, magnetic separation, electrostatic separation, optical separation, x-ray imaging separation, infrared imaging separation and combinations of these, without prior drying of the unbeneficiated ore and the trona-rich particles larger than about ¼ inch in size; and concurrently milling and then drying the trona-rich impurities-depleted ore fraction under non-calcining conditions to yield a dry uncalcined trona ore having a mean particle size less than about 50 microns and containing less than about 0.1 wt % free moisture.

18. The method of claim 17 wherein the concurrent milling and then drying of the trona-rich fraction comprises the sole trona drying operation to remove free moisture from the mined and beneficiated trona.

19. A process for flue gas desulfurization comprising injecting a particulate dry trona sorbent made by the method of claim 1 into a hot combustion gas stream containing $SO_x$, maintaining the trona sorbent in contact with the $SO_x$-containing flue gas stream for a time sufficient to react with at least a portion of the $SO_x$, collecting the injected and reacted trona sorbent downstream of the injection point in a solids collection device, and releasing the gas stream into the atmosphere.

20. The process of claim 19 wherein the flue gas stream at the trona sorbent injection point has a temperature of about 250° F. to about 900° F.

21. The process of claim 19 wherein the trona sorbent has a mean particle size smaller than about 50 microns.

* * * * *